United States Patent [19]
Schad et al.

[11] Patent Number: 5,013,513
[45] Date of Patent: May 7, 1991

[54] METHOD OF REMOVING GAS FROM THE CAVITY AND STABILIZING THE CORE DURING INJECTION MOLDING

[75] Inventors: Robert D. Schad, Toronto; John Disimone, Woodbridge, both of Canada; Terry Philips, Willoughby, Ohio

[73] Assignee: Husky Injection Molding Systems Ltd., Bolton, Canada

[21] Appl. No.: 357,122

[22] Filed: May 26, 1989

[51] Int. Cl.⁵ ............................................. B29C 45/22
[52] U.S. Cl. .......................... 264/328.8; 264/328.12; 264/328.15; 425/549; 425/570; 425/577
[58] Field of Search .......... 264/328.8, 328.12, 328.15; 425/548, 549, 570, 572, 573, 577, 468

[56] References Cited

U.S. PATENT DOCUMENTS

| | | | |
|---|---|---|---|
| 3,671,159 | 6/1972 | Greenberg et al. | 425/573 |
| 3,800,027 | 3/1974 | Tsutsumi | 425/547 |
| 4,083,903 | 4/1978 | Gilbert et al. | 264/328.8 |
| 4,420,452 | 12/1983 | van Dalen et al. | 264/328.8 |
| 4,702,689 | 10/1987 | Schmidt et al. | 264/328.8 |

OTHER PUBLICATIONS

*Injection Molding Handbood*, Rosato, 1986 pp. 186–189.

Primary Examiner—Jill L. Heitbrink
Attorney, Agent, or Firm—Bachman & LaPointe

[57] ABSTRACT

The method and apparatus includes an injection molding assembly including a mold, a core and a mold cavity therebetween wherein said mold cavity has a base, a peripheral area of said base and a central area of said base, at least two injection gates for injecting plastic material into said mold cavity situated adjacent the peripheral area of the mold cavity in a substantially balanced fashion, a source for injecting plastic material through the injection gates whereby molten plastic advances from the injection gates in the mold cavity to force gas in advance of the plastic and to stabilize the core, and means for venting the gas from the mold cavity.

3 Claims, 1 Drawing Sheet

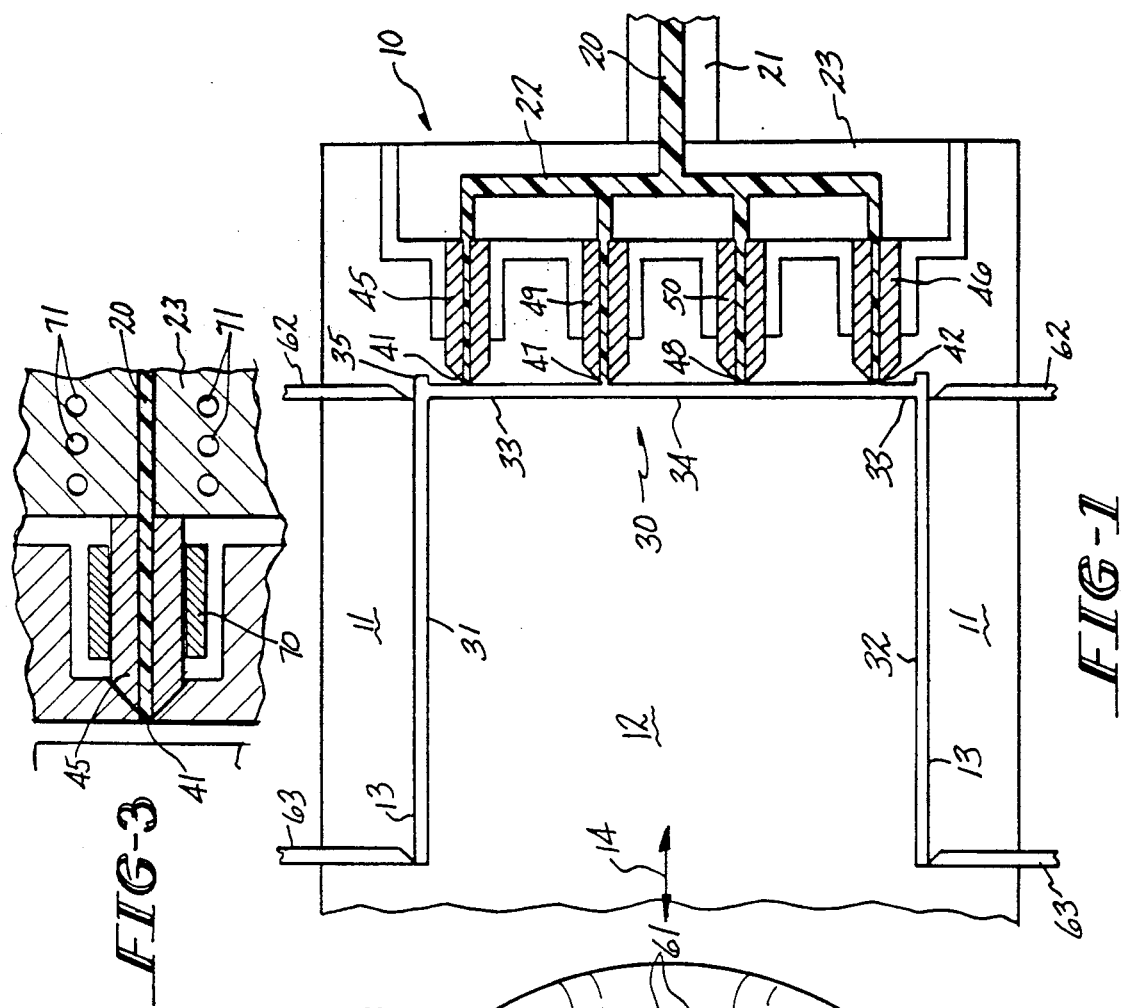
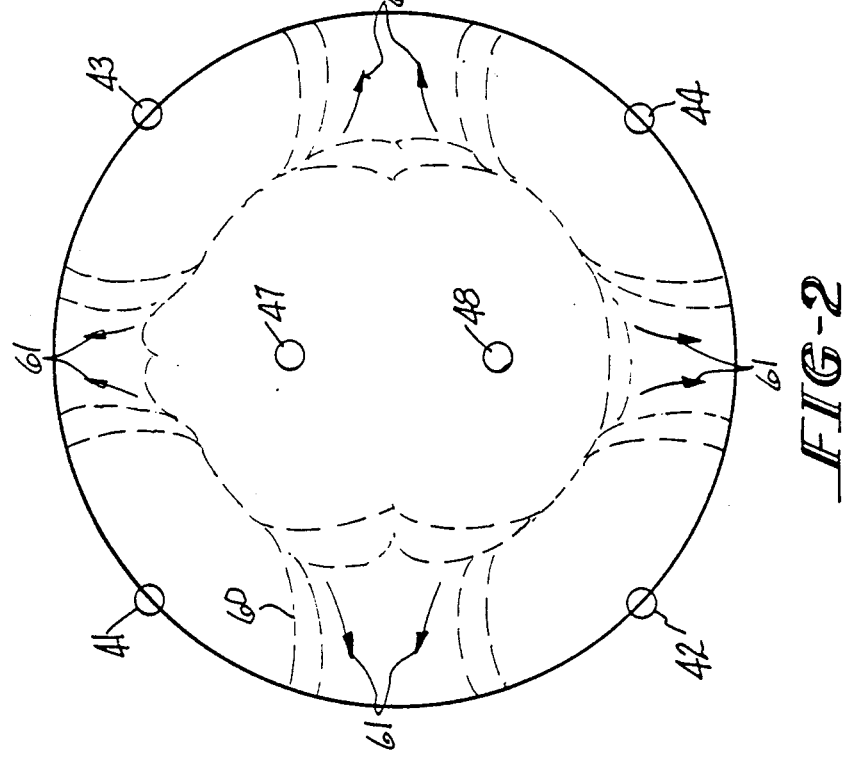

METHOD OF REMOVING GAS FROM THE CAVITY AND STABILIZING THE CORE DURING INJECTION MOLDING

BACKGROUND OF THE INVENTION

The present invention resides in a method and apparatus for injection molding, especially the injection molding of large containers, in order to conveniently remove gas from the mold cavity and to stabilize the injection core. The present invention is particularly suitable for the injection molding of large containers, such as industrial containers, boxes, crates or large automotive container shaped parts, for example, heater chambers, gas tanks and the like.

Injection molding of large containers is conventionally performed using single cavity molds having one gate in the center of the base of the part. The gate diameter is usually made as large as possible in order to minimize shear heating of the resin flowing through the gate; however, too large a diameter gate causes the molding cycle to be extended in order to allow the large mass of resin at the gate to freeze off prior to mold opening.

In some cases, large diameter valve gates have been used with some success, without cycle penalty. Copending U.S. patent application Ser. No. 148,029 for LARGE NOZZLE FOR HOT RUNNER MOLD, By Paul Brown shows such a gate. However, single cavity valve gate systems extend the length of the flow path of the resin and increase the shutheight of the mold, see U.S. Pat. No. 4,449,915. In addition to the foregoing, the molten plastic flow path must pass around the valve stem and its control mechanism. This leads to additional complication in the molten plastic flow channel design.

A further solution to this problem is to use a machine nozzle containing a pin or valve shut off and extending the nozzle to reach directly to the mold gate. This overcomes the disadvantages of a single cavity valve gated mold, however at the expense of modifying the machine nozzle which may represent a considerable expense.

A further problem arising from gating large containers centrally as aforesaid is that considerable core shift can occur. This problem is well known especially in thin wall injection molding of any size container where the resin has a long flow path from the gate to the parting line. Several solutions to this problem have been proposed. U.S. Pat. No. 3,397,266 to Ayres shows a container with a flow restriction formed in the bottom of the part between the core and the cavity such that the core is stabilized by the filling action of the bottom panel before filling of the side walls commences. U.S. Pat. Nos. 4,743,420 to H. V. Dutt and 4,807,775 to Sorensen show methods of varying the wall thickness of the parts bottom using radial flow channels to preferentially fill the sides with a stabilizing rib of resin before completing the fill. U.S. Pat. No. 4,508,676 to Sorensen shows a two step approach with multiple gates wherein the first step is to mold stabilizing pads of resin from gates located along the side walls of the part and then to complete filling of the mold cavity by a second injection step from a central gate. This patent also shows a mold with moving inserts which are used to stabilize the core during filling and then moving the inserts away to allow completion of the fill. Copending U.S. patent application Ser. No. 221,026 for DIRECT GATING INTO THE LIP OF THIN WALLED CONTAINER, By Robert D. Schad and U.S. Pat. No. 4,622,002 to Bormuth show means for reducing core shift by supplying the resin from the lip of the part and filling toward the base.

The foregoing methods are not entirely successful for various applications for a variety of reasons, including cost, specifications for the particular part, complexity of design and other reasons.

SUMMARY OF THE INVENTION

It is therefore a principal object of the present invention to provide a method and apparatus for injection molding which overcome the foregoing disadvantages.

It is a further object of the present invention to provide a method and apparatus which minimize core shift and conveniently injection molds large containers.

It is a still further object of the present invention to provide a method and apparatus as aforesaid which enables the use of small diameter gates without substantially increasing molten plastic flow path and without complex flow channel designs.

Further objects and advantages will appear hereinbelow.

In accordance with the present invention it has been found that the foregoing objects and advantages may be readily and conveniently obtained.

The apparatus of the present invention comprises an injection molding assembly including a mold, a core and a mold cavity therebetween, wherein said mold cavity has a base, a peripheral area of said base and a central area of said base, at least two injection gates for injecting plastic material into the mold cavity situated adjacent the peripheral area of said mold cavity in a substantially balanced fashion, means for injecting plastic material through the injection gates whereby molten plastic advances from the injection gates in said mold cavity to force gas in advance of the plastic and to stabilize the core, and means for venting the gas from the mold cavity. Preferably at least three or four injection gates are provided adjacent the peripheral area. In a preferred embodiment at least one and preferably two injection gates are provided adjacent the central area to force gas away from the central area and to further aid in stabilizing the core.

The method of the present invention comprises providing an injection molding assembly including a mold, a core and a mold cavity therebetween, wherein said mold cavity has a base, a peripheral area of said base and a central area of said base, injecting molten plastic material into said mold cavity through at least two injection gates, wherein said injection gates are situated adjacent the peripheral area of the mold cavity in a substantially balanced fashion, whereby molten plastic advances from said injection gates in said mold cavity to force gas in advance of the plastic and to stabilize the core, and venting the gas from the mold cavity.

The molten plastic material may be injected into the mold cavity simultaneously through the injection gates so that the molten plastic advances simultaneously from the injection gates in the mold cavity.

In a preferred embodiment, the peripheral gates in the peripheral locations may be timed to open after injection has begun in the central area, e.g., fractionally after said central injection. This may be accomplished in a preferred embodiment by operating the peripheral gates at a lower temperature than those in the central area.

In accordance with the present invention it has been found that the foregoing method and apparatus conveniently feeds the gas from the mold cavity and effectively stabilizes the core. Further, the method and apparatus of the present invention enables the use of small diameter gates without increasing the flow path of the molten plastic material and without complicated flow channel designs.

BRIEF DESCRIPTION OF THE DRAWINGS

The present invention will be more readily understandable from a consideration of the following illustrative drawings in which FIG. 1 is a sectional view, partly schematic, showing a typical large container mold in accordance with the present invention;

FIG. 2 shows a plan view of the mold cavity of FIG. 1 showing the gate layout and molten plastic flow therein; and FIG. 3 is an enlarged, sectional view showing a nozzle construction.

DETAILED DESCRIPTION

Referring to FIG. 1, injection mold assembly 10 includes mold 11, core 12 and mold cavity 13 therebetween. Core 12 is seated in mold 11 as shown in FIG. 1 to form mold cavity 13 therebetween, with the core being reciprocable in the direction shown by arrow 14. A plastic part is molded in mold cavity 13 when core 12 is seated in mold 11 as shown in FIG. 1. The core is then moved away from the mold by known means (not shown) in order to eject the molded part in a known manner. Molten plastic 20 is injected from a source of molten plastic (not shown) via mold sprue 21 to flow channel 22 in hot runner manifold 23, and thence to the nozzles and injection gates adjacent mold cavity 13 as will be described hereinbelow.

As can be seen in FIG. 1, the mold cavity 13 has a base 30 and side walls 31 and 32. Base 30 has a peripheral area 33 on either end thereof and a central area 34 in the central region of the base. The peripheral area may be flat or have any desired configuration, as with a flange or projection 35 as shown in FIG. 1. FIG. 2 shows four injection gates 41, 42, 43 and 44 circumferentially located adjacent the peripheral area 33 of mold cavity 13 in a substantially balanced fashion generally equidistantly spaced from each other. The injection gates may be situated at the peripheral area or slightly inwardly thereof as shown in FIG. 1. Two of these injection gates 41 and 42 are shown in FIG. 1 fed by injection nozzles 45 and 46 respectively. In the embodiment of FIGS. 1 and 2, two additional injection gates 47 and 48 are provided adjacent central area 34 in a balanced fashion. These are shown in FIG. 1 fed by injection nozzles 49 and 50 respectively.

Thus it can be seen that the injection gates are positioned circumferentially adjacent the base of the mold cavity and if desired in addition adjacent the central area of the mold cavity. Resin from mold sprue 21 is supplied to all the gates, with if desired appropriate means provided (not shown) to terminate resin flow when the mold cavity is filled as is well known in the art. FIG. 2 shows the melt front 60 advancing from the injection gates in the direction of the arrows 61 so that the melt front advances with gas forced away from the central area of the base. Vents 62 are provided adjacent the peripheral area of the base and vents 63 are provided adjacent the top of side walls 31 and 32 (the lip area) in order to properly vent the gas into the atmosphere. Naturally, if central gates 47 and 48 are omitted, vents may be provided adjacent the central area.

The gating at the circumference of the part effectively reduces the flow length of the resin. By introducing the resin directly adjacent the side wall and from several equispaced gates, this will immediately stabilize the core with respect to the cavity as the resin fills the cavity. Further, by supplying resin through at least two gates and preferably three or four peripherally located and one or more centrally located, sidewall core shift is minimized and flow length is significantly reduced.

Naturally, a variety of specific injection gate locations can be readily provided. For example, the injection gates located adjacent the peripheral area of the base and may be at the side wall or may be located spaced inwards from the side wall. Also, a single gate may be centrally located or two or three gates may be centrally located. The combination of number and location of gates may be varied depending on the particular circumstances.

Furthermore, the method and apparatus of the present invention enables small diameter gates without increasing flow path and with the significant advantage of core stabilization.

The molten plastic material may if desired be injected into the mold cavity simultaneously through the injection gates so that there is simultaneous advance of the molten plastic from the injection gates in the mold cavity.

Alternatively, delayed injection can be provided from some locations. In a preferred embodiment, the peripheral gates in the peripheral locations may be timed to open after injection has begun in the central area as by operating the peripheral gates at a lower temperature than the gates at the central area. This can be accomplished as shown in FIG. 3 which shows injection gate 41 and injection nozzle 45 including heating means 70 adjacent nozzle 45 for regulating the temperature of molten plastic 20 located therein. Manifold 23 may contain separate heating means 71. Heating means 70 and 71 are naturally connected appropriate heat control means (not shown) and of course the other nozzles may be provided with similar heat means.

In accordance with this procedure the central gates will be operated at a higher temperature than the peripheral gates. The central gates will start flowing first because of their higher temperature. As the resin fills base 30 the pressure inside the cavity will increase because the flow length is increasing from the center gates. At some point, this increasing cavity pressure will exceed the pressure of the resin in the manifold and the peripheral nozzles, held at a slightly lower temperature. When this happens the peripheral nozzles will start to flow. This results in a simplified mold construction and operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method which comprises: providing an injection molding assembly including a mold, a core and a mold cavity therebetween, wherein said mold cavity has a base, a peripheral area of said base and a central area of said base; injecting molten plastic material into said mold cavity through at least two injection gates, wherein said injection gates are situated adjacent the peripheral area of said mold cavity in a substantially balanced fashion generally equidistantly spaced from each other with a substantially symmetrical disposition, whereby molten plastic advances from the injection gates in the mold cavity to force gas in advance of the plastic and to stabilize the core; including in addition injecting molten plastic material through an injection gate positioned adjacent the central area of said base, wherein molten plastic is first injected through the central gate followed by injecting molten plastic through the peripheral gates and including the step of maintaining the peripheral gates at a lower temperature than the central gate; and venting the gas from the mold cavity.

2. A method according to claim 11 including in addition injecting molten plastic through four injection gates positioned circumferentially adjacent the peripheral area of the base.

3. A method according to claim 1 including in addition injecting molten plastic through two injection gates positioned adjacent the central area of said base.

* * * * *